United States Patent
Meylan et al.

(10) Patent No.: US 8,902,826 B2
(45) Date of Patent: Dec. 2, 2014

(54) PHYSICAL RANDOM ACCESS CHANNEL RESOURCE SELECTION

(75) Inventors: Arnaud Meylan, San Diego, CA (US); Xiaoxia Zhang, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 1063 days.

(21) Appl. No.: 12/562,615

(22) Filed: Sep. 18, 2009

(65) Prior Publication Data

US 2010/0135225 A1    Jun. 3, 2010

Related U.S. Application Data

(60) Provisional application No. 61/100,922, filed on Sep. 29, 2008.

(51) Int. Cl.
| H04W 4/00 | (2009.01) |
| H04W 74/00 | (2009.01) |
| H04W 48/12 | (2009.01) |
| H04W 74/08 | (2009.01) |

(52) U.S. Cl.
CPC ............ H04W 74/006 (2013.01); H04W 48/12 (2013.01); H04W 74/0866 (2013.01)
USPC .......................................................... 370/329

(58) Field of Classification Search
CPC ................................................. H04W 74/006
USPC .......................................................... 370/329
See application file for complete search history.

(56) References Cited

U.S. PATENT DOCUMENTS

| 6,707,808 B1 * | 3/2004 | Vedrine .......................... 370/337 |
| 8,185,123 B2 * | 5/2012 | Shin .............................. 455/450 |
| 2002/0041578 A1 | 4/2002 | Kim et al. |
| 2002/0089957 A1 | 7/2002 | Viero |
| 2008/0101305 A1 * | 5/2008 | Cave et al. ..................... 370/336 |
| 2008/0101313 A1 | 5/2008 | Choi et al. |
| 2008/0165733 A1 * | 7/2008 | Xiao et al. ..................... 370/330 |
| 2008/0310338 A1 * | 12/2008 | Charpenter et al. .......... 370/315 |
| 2009/0088175 A1 * | 4/2009 | Pelletier et al. .............. 455/450 |

FOREIGN PATENT DOCUMENTS

| CN | 1381107 A | 11/2002 |
| JP | 2003501909 A | 1/2003 |
| JP | 2003506932 A | 2/2003 |
| JP | 2003535553 A | 11/2003 |
| JP | 2007097223 A | 4/2007 |
| KR | 100389818 | 7/2003 |
| WO | 0193462 | 12/2001 |
| WO | WO2008069406 A2 | 6/2008 |

OTHER PUBLICATIONS

International Search Report and Written Opinion—PCT/US2009/058884—ISA/EPO—Feb. 4, 2010.
Taiwan Search Report—TW098133009—TIPO—Dec. 17, 2012.

* cited by examiner

*Primary Examiner* — Mark Rinehart
*Assistant Examiner* — Maharishi Khirodhar
(74) *Attorney, Agent, or Firm* — Liem T. Do

(57) ABSTRACT

Systems and methodologies are described that facilitates managing assignment of available random access resources in order to minimize delay and random access load. A number of available random access resources can be defined by a network or a base station, wherein a user equipment can access the number of available random access resources via an information block. The user equipment can be randomly assigned or uniformly assigned to at least one of the number of available random access resources. Additionally, the network can adjust the defined number of available random access resources based upon reported delay, base station load, or historic load data for a base station.

68 Claims, 11 Drawing Sheets

PHYSICAL RANDOM ACCESS CHANNEL RESOURCE SELECTION

CROSS-REFERENCE TO RELATED APPLICATIONS

This application claims the benefit of U.S. Provisional Patent application Ser. No. 61/100,922 entitled "PHYSICAL RANDOM ACCESS CHANNEL RESOURCE SELECTION" which was filed Sep. 29, 2008. The entirety of the aforementioned application is herein incorporated by reference.

BACKGROUND

I. Field

The following description relates generally to wireless communications, and more particularly to identification of random access resources.

II. Background

Wireless communication systems are widely deployed to provide various types of communication; for instance, voice and/or data can be provided via such wireless communication systems. A typical wireless communication system, or network, can provide multiple users access to one or more shared resources (e.g., bandwidth, transmit power, . . . ). For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations.

Wireless communication systems oftentimes employ one or more base stations that provide a coverage area. A typical base station can transmit multiple data streams for broadcast, multicast and/or unicast services, wherein a data stream may be a stream of data that can be of independent reception interest to a mobile device. A mobile device within the coverage area of such base station can be employed to receive one, more than one, or all the data streams carried by the composite stream. Likewise, a mobile device can transmit data to the base station or another mobile device.

Area tracking within a wireless communication system enables a tracking area location for user equipment (e.g., mobile device, mobile communication apparatus, cellular device, smartphone, etc.) to be defined. Typically, a network can request or page the user equipment (UE) in which the UE can respond with such tracking area location. This enables the tracking area location of the UE to be communicated and updated to the network.

Within a multiple carrier wireless environment, there are numerous uplink and/or downlink carriers that are within such heterogeneous networks. Access procedure involves a user equipment (UE) obtaining C-RNTI, establishing uplink (UL) synchronization, receiving physical channel configurations and/or obtaining information for RRC connected mode. Moreover, a Physical Random Access Channel (PRACH) process involves a user equipment (UE) to initiate a PRACH message to a base station via an uplink carrier, wherein the base station replies via a downlink carrier.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

According to related aspects, a method that facilitates minimizing delay and random access load. The method can include accessing a system information block. Further, the method can include identifying a number available random access resources based upon the accessed system information block. Moreover, the method can comprise utilizing at least one of the number of available random access resources.

Another aspect relates to a wireless communications apparatus. The wireless communications apparatus can include at least one processor configured to access a system information block, identify a number available random access resources based upon the accessed system information block, and utilize at least one of the number of available random access resources. Further, the wireless communications apparatus can include memory coupled to the at least one processor.

Yet another aspect relates to a wireless communications apparatus that minimizes delay and random access load within a wireless environment. The wireless communications apparatus can include means for accessing a system information block. Additionally, the wireless communications apparatus can comprise means for identifying a number available random access resources based upon the accessed system information block. Further, the wireless communications apparatus can comprise means for utilizing at least one of the number of available random access resources.

Still another aspect relates to a computer program product comprising a computer-readable medium having stored thereon code causing at least one computer to access a system information block, identify a number available random access resources based upon the accessed system information block, and utilize at least one of the number of available random access resources.

According to other aspects, a method that facilitates managing random access resources. The method can comprise configuring a number available random access resources for a base station. Further, the method can comprise defining the number of available random access resources within a system information block. Moreover, the method can include enabling a user equipment (UE) to access the system information block to identify the number of available random access resources.

Another aspect relates to a wireless communications apparatus. The wireless communications apparatus can include at least one processor configured to configure a number available random access resources for a base station, define the number of available random access resources within a system information block, and enable a user equipment (UE) to access the system information block to identify the number of available random access resources. Further, the wireless communications apparatus can include memory coupled to the at least one processor.

Another aspect relates to a wireless communications apparatus that manages random access resources within a wireless communications environment. The wireless communications apparatus can comprise means for configuring a number available random access resources for a base station. Moreover, the wireless communications apparatus can comprise means for defining the number of available random access resources within a system information block. Further, the wireless communications apparatus can include means for enabling a user equipment (UE) to access the system information block to identify the number of available random access resources.

Still another aspect relates to a computer program product comprising a computer-readable medium having stored thereon code for causing at least one computer to configure a number available random access resources for a base station, define the number of available random access resources within a system information block, and enable a user equipment (UE) to access the system information block to identify the number of available random access resources.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
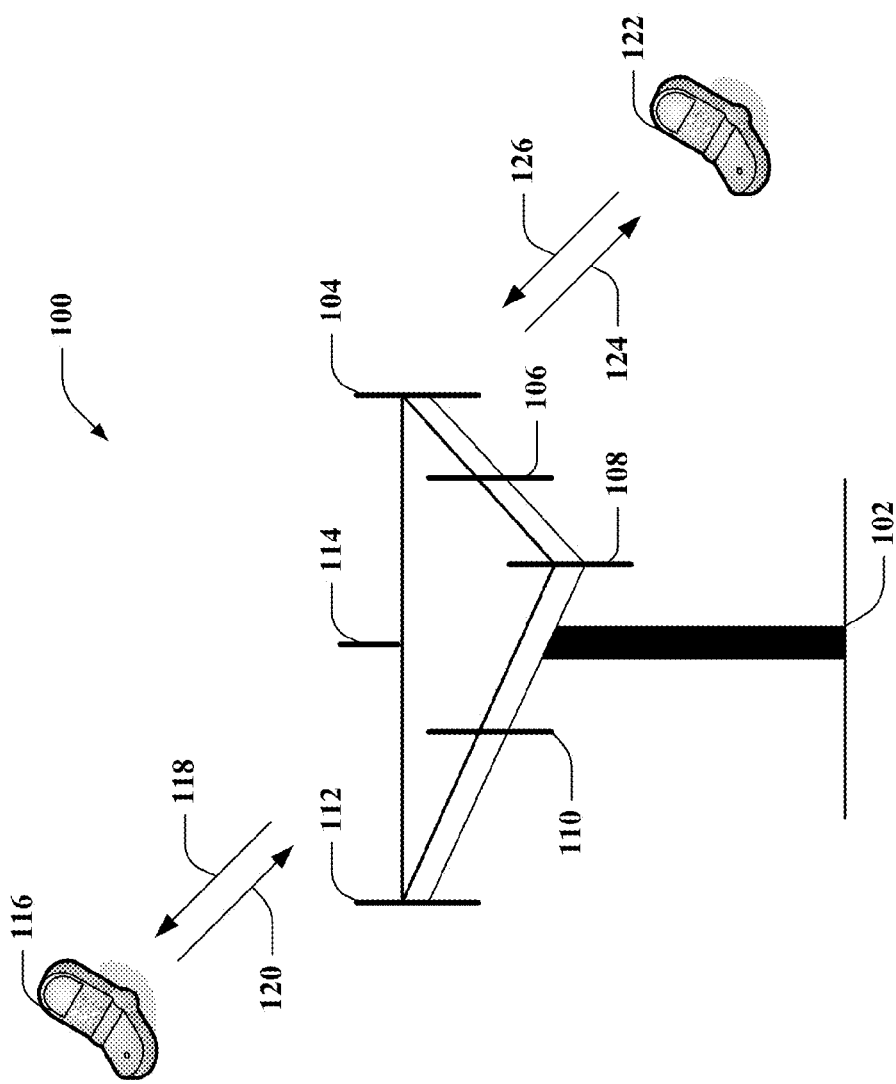
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "module," "carrier," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA) and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency. Accordingly, SC-FDMA can be implemented as an uplink multiple access scheme in 3GPP Long Term Evolution (LTE) or Evolved UTRA.

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device(s) and can also be referred to as an access point, Node B, or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices.

Base station 102 (and/or each sector of base station 102) can employ one or more multiple access technologies (e.g., CDMA, TDMA, FDMA, OFDMA, . . . ). For instance, base station 102 can utilize a particular technology for communicating with mobile devices (e.g., mobile devices 116 and 122) upon a corresponding bandwidth. Moreover, if more than one technology is employed by base station 102, each technology can be associated with a respective bandwidth. The technologies described herein can include following: Global System for Mobile (GSM), General Packet Radio Service (GPRS), Enhanced Data Rates for GSM Evolution (EDGE), Universal Mobile Telecommunications System (UMTS), Wideband Code Division Multiple Access (W-CDMA), cdmaOne (IS-95), CDMA2000, Evolution-Data Optimized (EV-DO), Ultra Mobile Broadband (UMB), Worldwide Interoperability for Microwave Access (WiMAX), MediaFLO, Digital Multimedia Broadcasting (DMB), Digital Video Broadcasting-Handheld (DVB-H), etc. It is to be appreciated that the aforementioned listing of technologies is provided as an example and the claimed subject matter is not so limited; rather, substantially any wireless communication technology is intended to fall within the scope of the hereto appended claims.

Base station 102 can employ a first bandwidth with a first technology. Moreover, base station 102 can transmit a pilot corresponding to the first technology on a second bandwidth. According to an illustration, the second bandwidth can be leveraged by base station 102 and/or any disparate base station (not shown) for communication that utilizes any second technology. Moreover, the pilot can indicate the presence of the first technology (e.g., to a mobile device communicating via the second technology). For example, the pilot can use bit(s) to carry information about the presence of the first technology. Additionally, information such as a SectorID of the sector utilizing the first technology, a Carrierindex indicating the first frequency bandwidth, and the like can be included in the pilot.

According to another example, the pilot can be a beacon (and/or a sequence of beacons). A beacon can be an OFDM symbol where a large fraction of the power is transmitted on one subcarrier or a few subcarriers (e.g., small number of subcarriers). Thus, the beacon provides a strong peak that can be observed by mobile devices, while interfering with data on a narrow portion of bandwidth (e.g., the remainder of the bandwidth can be unaffected by the beacon). Following this example, a first sector can communicate via CDMA on a first bandwidth and a second sector can communicate via OFDM on a second bandwidth. Accordingly, the first sector can signify the availability of CDMA on the first bandwidth (e.g., to mobile device(s) operating utilizing OFDM on the second bandwidth) by transmitting an OFDM beacon (or a sequence of OFDM beacons) upon the second bandwidth.

The subject innovation can define a number of available random access resources that are available for a user equipment to be assigned. For example, the user equipment can identify a defined number of random access resources via an information block in which the user equipment can randomly or uniformly be assigned to at least one of the defined number of random access resources. A network and/or base station can define or set the number of available random access resources based upon a load, historic load data, and/or an amount of reported/detected delay. For example, based upon such delay, the number of random access resources that a user equipment can be assigned can be increased or decreased.

Figure 2:
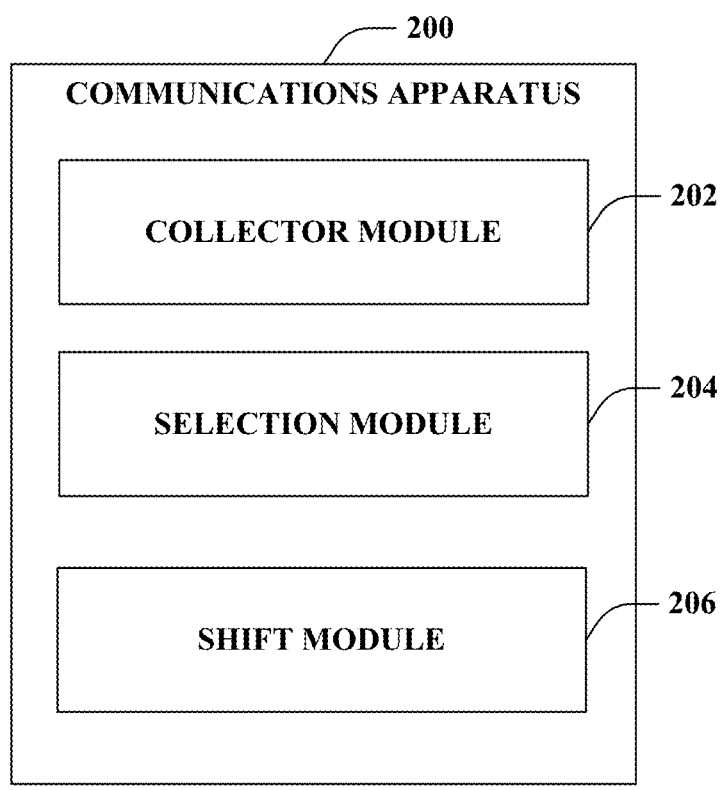
FIG. 2 is an illustration of an example communications apparatus for employment within a wireless communications environment.

Turning to FIG. 2, illustrated is a communications apparatus 200 for employment within a wireless communications environment. The communications apparatus 200 can be a base station or a portion thereof, a mobile device or a portion thereof, or substantially any communications apparatus that receives data transmitted in a wireless communications environment. In communications systems, the communications apparatus 200 employ components described below to manage assignment of random access resources to a user equipment based upon defined set of available number of random access resources.

The communications apparatus 200 can include a collector module 202 that can access an information block, wherein the information block can define the available number of random access resources that a user equipment can be assigned. The communications apparatus 200 can further include a selection module 204 that selects or assigns at least one of the available number of random access resources. It is to be appreciated that the assignment can be random or uniform. For example, the user equipment can be randomly assigned one of the available number of random access resources. Thus, a first user equipment can be randomly assigned one of the random access resources and a second user equipment can be randomly assigned one of the random access resources. In another example, user equipment can be uniformly assigned random access resources such that the assignment distribution is even and/or uniform across the defined number of available random access resources.

The communications apparatus 200 can further include a shift module 206 that can employ a time shift between a first Physical Random Access Channel (PRACH) configuration and a second PRACH configuration. It is to be appreciated that the time shift can be any suitable period of time in order to differentiate a first PRACH configuration with a second PRACH configuration. Please refer to FIG. 4 for additional details.

Additionally, although not shown, the communications apparatus 200 can communicate delay information or load data that reports/detects an amount of delay associated with an assigned random access resource based upon load. For example, the delay information can be reported or detected in order to facilitate a network and/or base station to define the number of available random access resources. Thus, the defined number of available random access resources can be increased, decreased, or maintained based upon an amount of delay. For instance, an increase in the defined number of available random access resources can increase delay, whereas a decrease in the defined number of available random access resources can decrease delay. In general, a load for a base station can be managed by adjusting the defined number of available random access resources thereby managing delay as well.

Moreover, although not shown, it is to be appreciated that communications apparatus 200 can include memory that retains instructions with respect to accessing a system information block, identifying a number available random access resources based upon the accessed system information block, utilizing at least one of the number of available random access resources, and the like. Further, communications apparatus 200 can include a processor that may be utilized in connection with executing instructions (e.g., instructions retained within memory, instructions obtained from a disparate source, ... ).

Additionally, although not shown, it is to be appreciated that communications apparatus 200 can include memory that retains instructions with respect to configuring a number available random access resources for a base station, defining the number of available random access resources within a system information block, enabling a user equipment (UE) to access the system information block to identify the number of available random access resources, and the like. Further, communications apparatus 200 can include a processor that may be utilized in connection with executing instructions (e.g., instructions retained within memory, instructions obtained from a disparate source, ... ).

Figure 3:
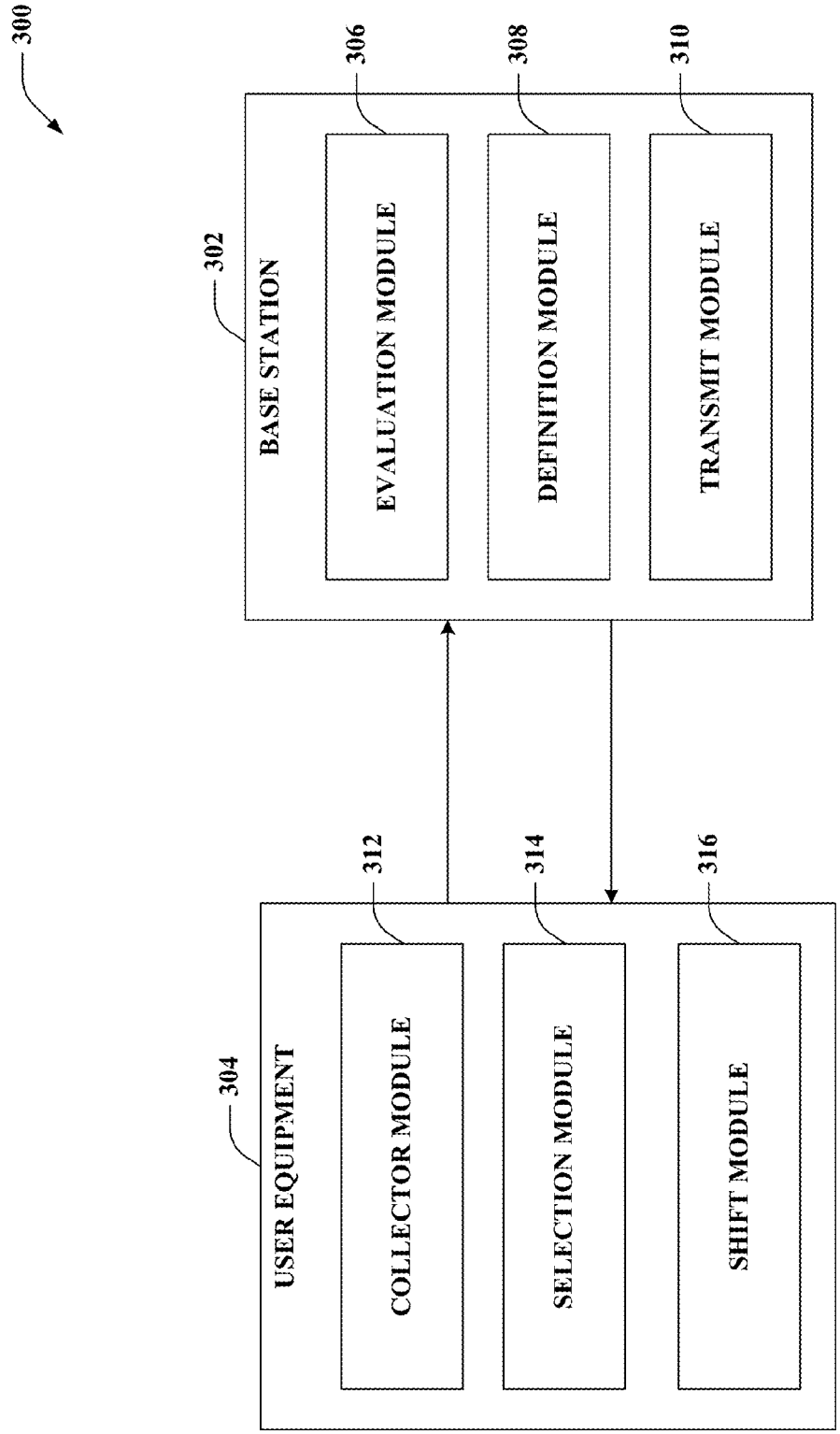
FIG. 3 is an illustration of an example wireless communications system that facilitates managing assignment of random access resources in order to minimize delay and random access load.

Now referring to FIG. 3, illustrated is a wireless communications system 300 that can provide management assignment of random access resources in order to minimize delay and random access load. The system 300 includes a base station 302 that communicates with a user equipment 304 (and/or any number of disparate user equipment (not shown)). Base station 302 can transmit information to user equipment 304 over a forward link channel; further base station 302 can receive information from user equipment 304 over a reverse link channel. Moreover, system 300 can be a MIMO system. Additionally, the system 300 can operate in an OFDMA wireless network, a 3GPP LTE wireless network, etc. Also, the components and functionalities shown and described below in the base station 302 can be present in the user equipment 304 as well and vice versa, in one example; the configuration depicted excludes these components for ease of explanation.

Base station 302 includes an evaluation module 306 that can evaluate characteristics in order to define a number of available random access resources to which a user equipment can be assigned. The evaluation module 306 can evaluate at least one of a load associated with a base station, an amount of delay related to a user equipment communicating with a base station, and/or a portion of historic data related to delay and/or load.

The base station 302 can include a definition module 308 that can define a number of available random access resources to which a user equipment can be assigned. For instance, the definition module 308 can implement a default value for the number of available random access resources. For instance, the default value can be a positive integer greater than zero (0). In another example, the defined value for the number of available random access resources can be dynamic in which the number can be adjusted based upon the evaluation module 306.

The base station 302 can further include a transmit module 310 that can communicate the defined number of available random access resources to the user equipment 304. In general, the transmit module 310 can communicate the defined number of available random access resources to the user equipment 304 via a system information block. It is to be appreciated that any suitable technique or communication can be employed in order to broadcast the defined number of available random access resources to the user equipment 304.

The user equipment 304 can include a collector module 312 that can collect or identify the defined number of available random access resources in which the user equipment 304 can be assigned. For example, the collector module 312 can access a system information block, wherein the number of available random access resources can be defined. The user equipment 304 can include a selection module 314 that can select or assign at least one of the defined number of available random access resources to the user equipment 304. It is to be appreciated that the selection module 314 can employ a random assignment or a uniform assignment based upon the amount of user equipment on each of the available random access resources.

The user equipment 304 can further include a shift module 316 that can employ a time shift between a first Physical Random Access Channel (PRACH) configuration and a second PRACH configuration. It is to be appreciated that the time shift can be any suitable period of time in order to differentiate a first PRACH configuration with a second PRACH configuration.

Moreover, although not shown, it is to be appreciated that base station 302 can include memory that retains instructions with respect to accessing a system information block, identifying a number available random access resources based upon the accessed system information block, utilizing at least one of the number of available random access resources, and the like. Further, communications apparatus 200 can include a processor that may be utilized in connection with executing instructions (e.g., instructions retained within memory, instructions obtained from a disparate source, . . . ).

Additionally, although not shown, it is to be appreciated that base station 302 can include memory that retains instructions with respect to configuring a number available random access resources for a base station, defining the number of available random access resources within a system information block, enabling a user equipment (UE) to access the system information block to identify the number of available random access resources, and the like. Further, communications apparatus 200 can include a processor that may be utilized in connection with executing instructions (e.g., instructions retained within memory, instructions obtained from a disparate source, . . . ).

Figure 4:
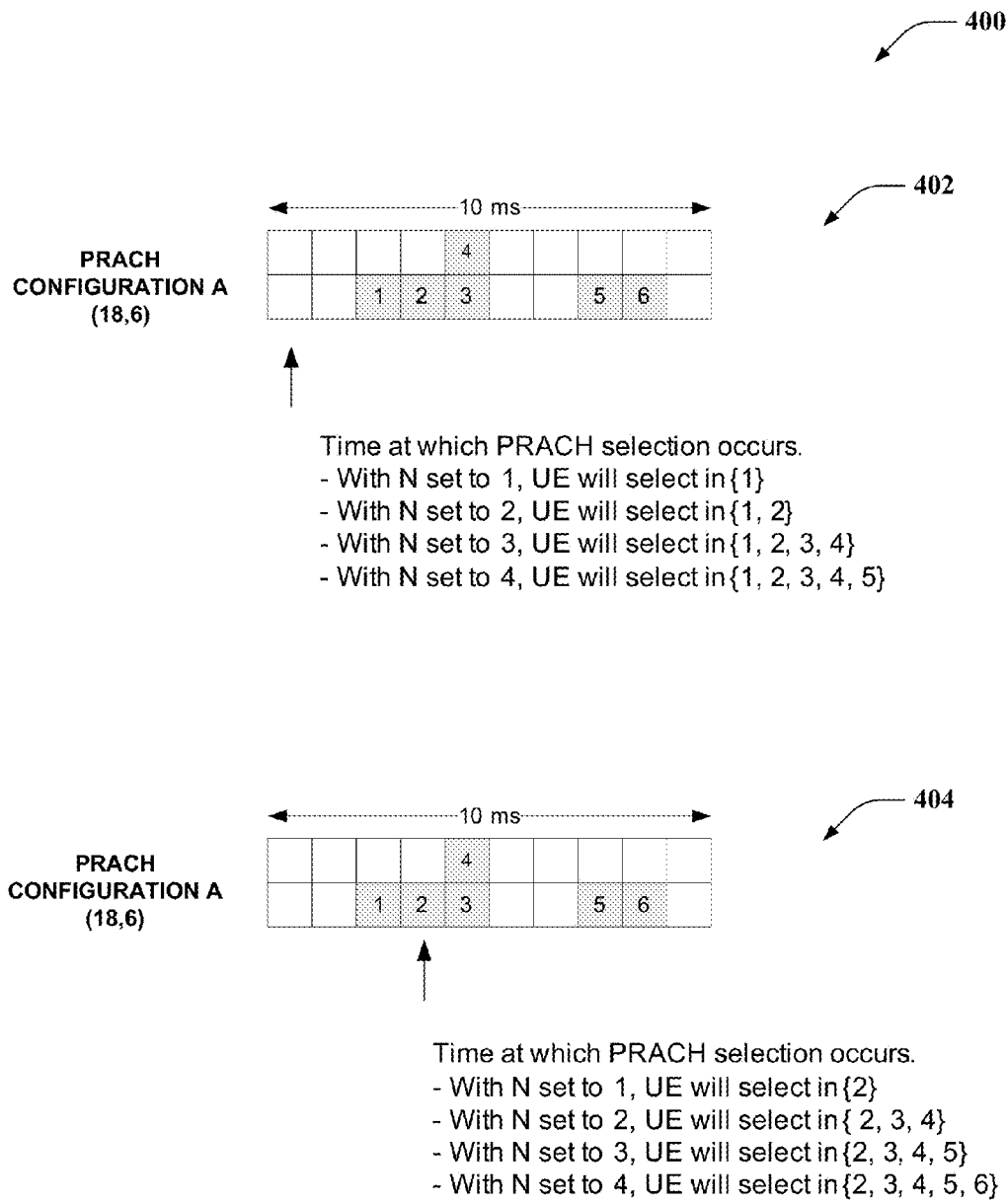
FIG. 4 is an illustration of an example system that facilitates implementing a time shift between a first Physical Random Access Channel (PRACH) configuration and a second PRACH configuration.

Now referring to FIG. 4, an example wireless communications system 400 can provide implementation of a time shift between a first Physical Random Access Channel (PRACH) configuration and a second PRACH configuration.

The system 400 can include a first PRACH configuration A (18, 6) 402 and a second PRACH configuration A (18,6) 404, wherein the second PRACH configuration 404 includes an added time shift in comparison to the first PRACH configuration 402. It is to be appreciated that N is a defined number of available random access resources to which a user equipment can be assigned. For example, if the network and/or base station define N to be three (3), then the UE can be randomly assigned or uniformly assigned (based on loads of each random access resource) to 1, 2, 3, or 4.

The system 400 can allow tuning between RACH even load and RACH minimal delay. UE can randomly pick according to a uniform distribution among the PRACH occasions in the upcoming N subframes which have PRACH occasion(s). N (e.g., the number of available random access resources) can be indicated in system information. For example, within a system information block, 2 bits can be utilized to represent {1, 2, 3, 4}. In another example, a default value (e.g., a positive integer greater than zero can be utilized to minimize delay. For instance, with DEFAULT value set to one (1), delay can be minimized. This can spread the load uniformly and delay can be kept low if needed. It is to be appreciated that this method can be used for TDD an FDD. Conventionally, PRACH delay is minimized at the cost of an uneven PRACH load. This means PRACH generates excess overhead. Yet, the subject innovation allows the overhead to be minimized and/or reduced.

Figure 5:
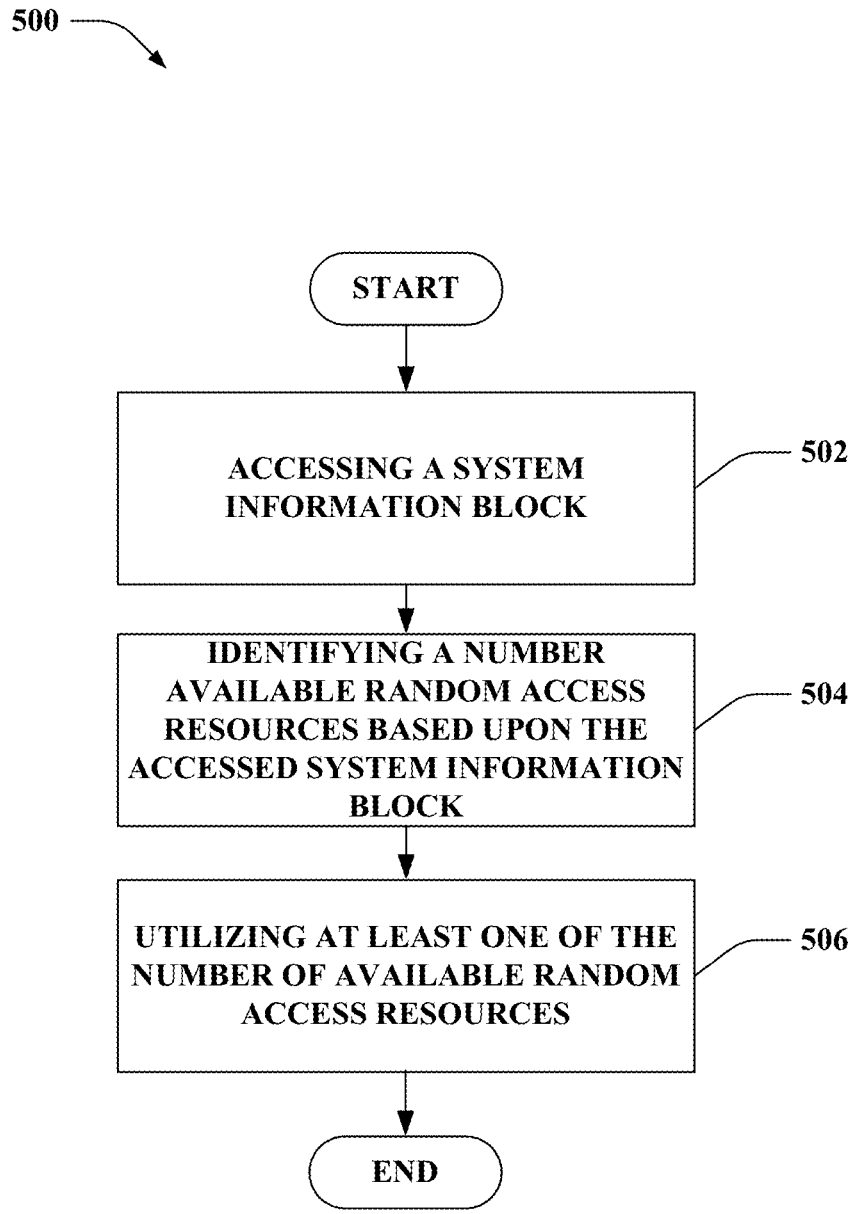
FIG. 5 is an illustration of an example methodology that facilitates minimizing random access load and delay within a wireless environment.
Figure 6:
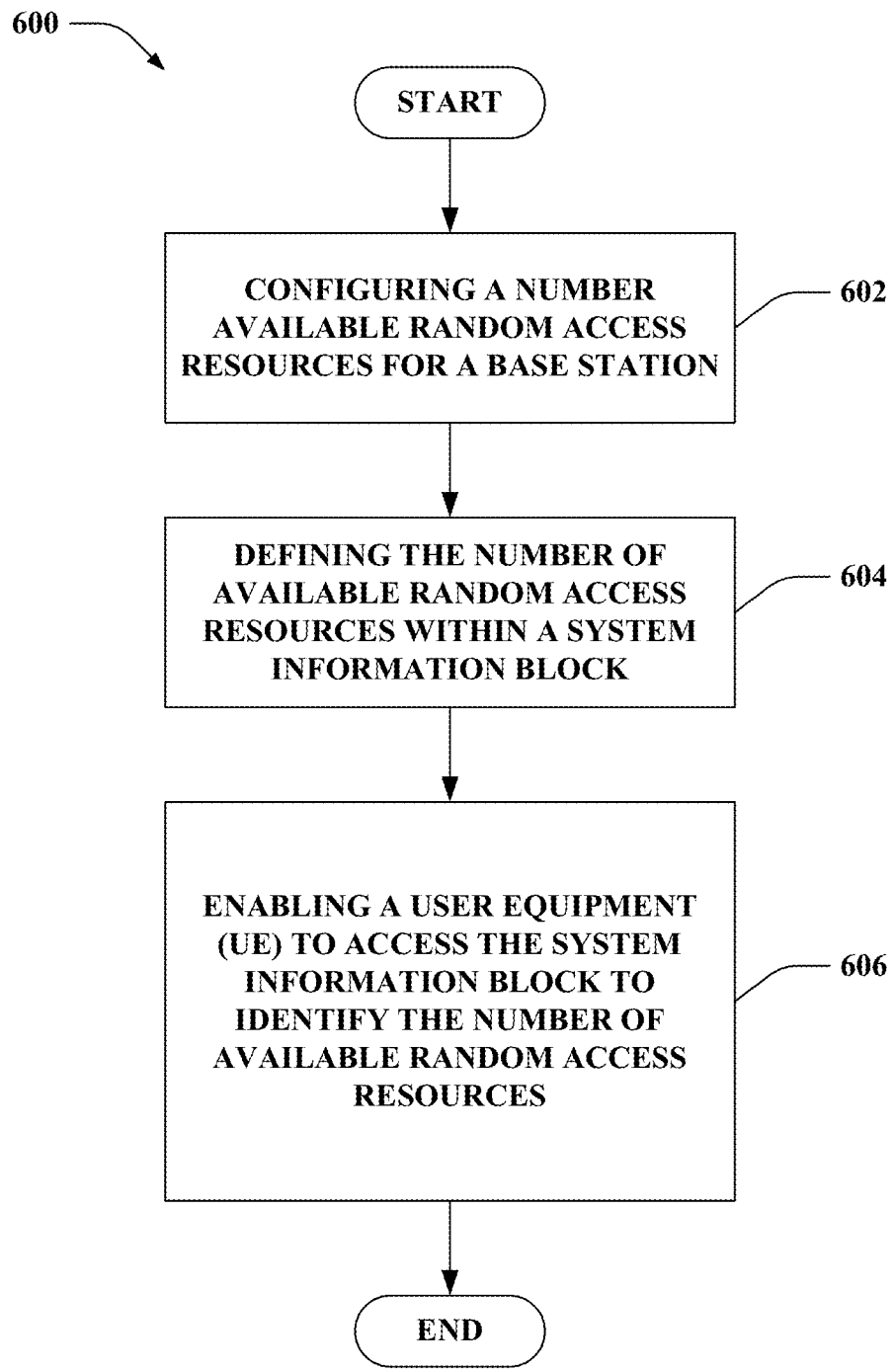
FIG. 6 is an illustration of an example methodology that facilitates managing random access resource assignment within a wireless communications environment.

Referring to FIGS. 5-6, methodologies relating to minimizing delay and random access load within a wireless environment are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning to FIG. 5, illustrated is a methodology 500 that facilitates minimizing random access load and delay within a wireless environment. At reference numeral 502, a system information block can be accessed. At reference numeral 504, a number available random access resources based upon the accessed system information block can be identified. At reference numeral 506, at least one of the number of available random access resources can be utilized.

Now referring to FIG. 6, a methodology 600 that facilitates managing random access resource assignment within a wireless communications environment. At reference numeral 602, a number available random access resources for a base station can be configured. At reference numeral 604, the number of available random access resources within a system information block can be defined. At reference numeral 606, a user equipment (UE) can be enabled to access the system information block to identify the number of available random access resources.

Figure 7:
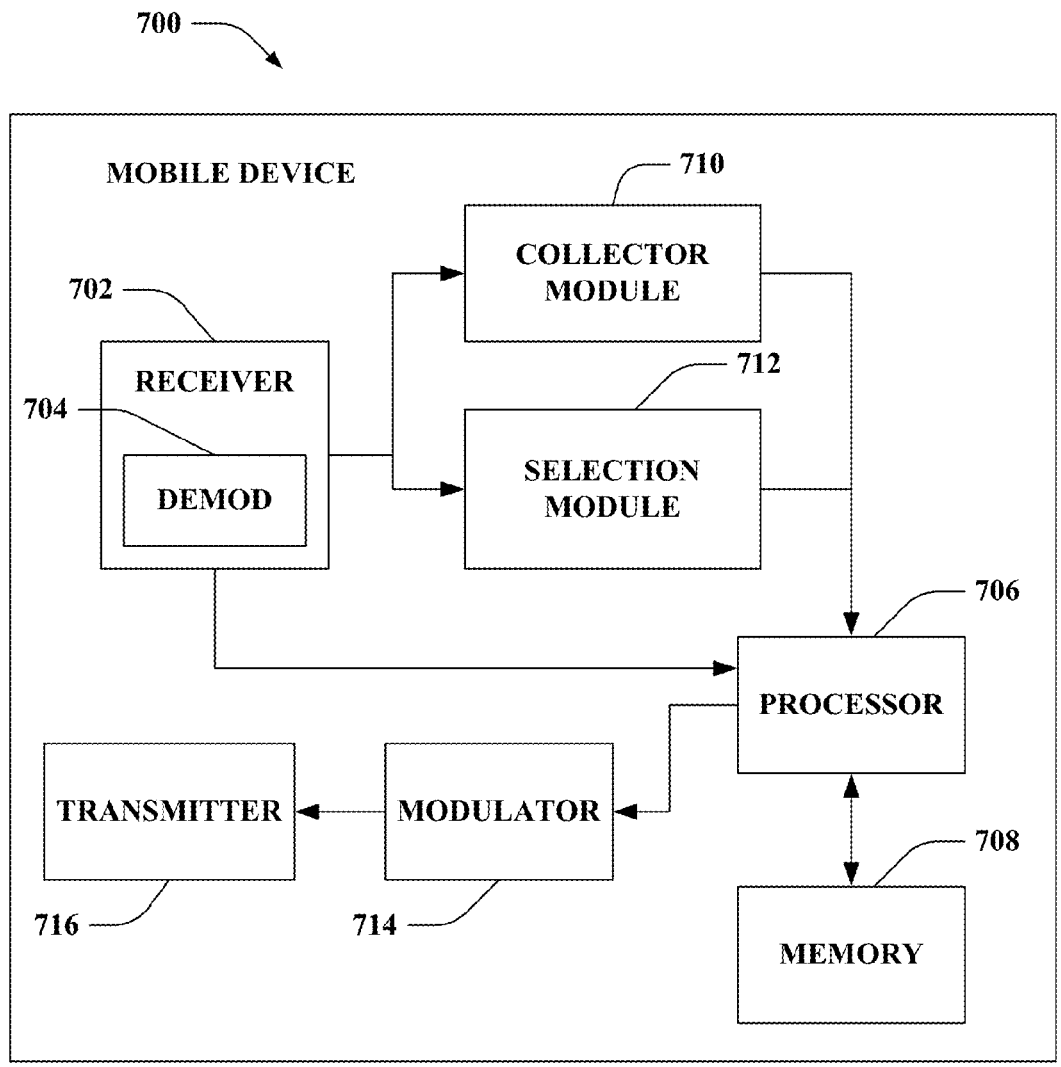
FIG. 7 is an illustration of an example mobile device that facilitates employing random access resource assignment in a wireless communication system.

FIG. 7 is an illustration of a mobile device 700 that facilitates employing random access resource assignment in a wireless communication system. Mobile device 700 comprises a receiver 702 that receives a signal from, for instance, a receive antenna (not shown), performs typical actions on (e.g., filters, amplifies, downconverts, etc.) the received signal, and digitizes the conditioned signal to obtain samples. Receiver 702 can comprise a demodulator 704 that can demodulate received symbols and provide them to a processor 706 for channel estimation. Processor 706 can be a processor dedicated to analyzing information received by receiver 702 and/or generating information for transmission by a transmitter 716, a processor that controls one or more components of mobile device 700, and/or a processor that both analyzes information received by receiver 702, generates information for transmission by transmitter 716, and controls one or more components of mobile device 700.

Mobile device 700 can additionally comprise memory 708 that is operatively coupled to processor 706 and that can store data to be transmitted, received data, information related to available channels, data associated with analyzed signal and/or interference strength, information related to an assigned channel, power, rate, or the like, and any other suitable information for estimating a channel and communicating via the channel. Memory 708 can additionally store protocols and/or algorithms associated with estimating and/or utilizing a channel (e.g., performance based, capacity based, etc.).

It will be appreciated that the data store (e.g., memory 708) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 708 of the subject systems and methods is intended to comprise, without being limited to, these and any other suitable types of memory.

Processor 706 can further be operatively coupled to a collector module 710 and/or a selection module 712. The collector module 710 can access or identify a defined number of available random access resources to which the user equipment (e.g., mobile device 700) can be assigned. The collector module 710 can access the system information block in order to identify the number of available random access resources. The selection module 712 can assign one random access resource from the set of defined available random access resources to the mobile device 700. It is to be appreciated that the selection module 712 can employ a random selection from the set of available random access resources or a uniform assignment based upon the load of each random access resource.

Mobile device 700 still further comprises a modulator 714 and transmitter 716 that respectively modulate and transmit signals to, for instance, a base station, another mobile device, etc. Although depicted as being separate from the processor 606, it is to be appreciated that the collector module 710, selection module 712, demodulator 704, and/or modulator 714 can be part of the processor 706 or multiple processors (not shown).

Figure 8:
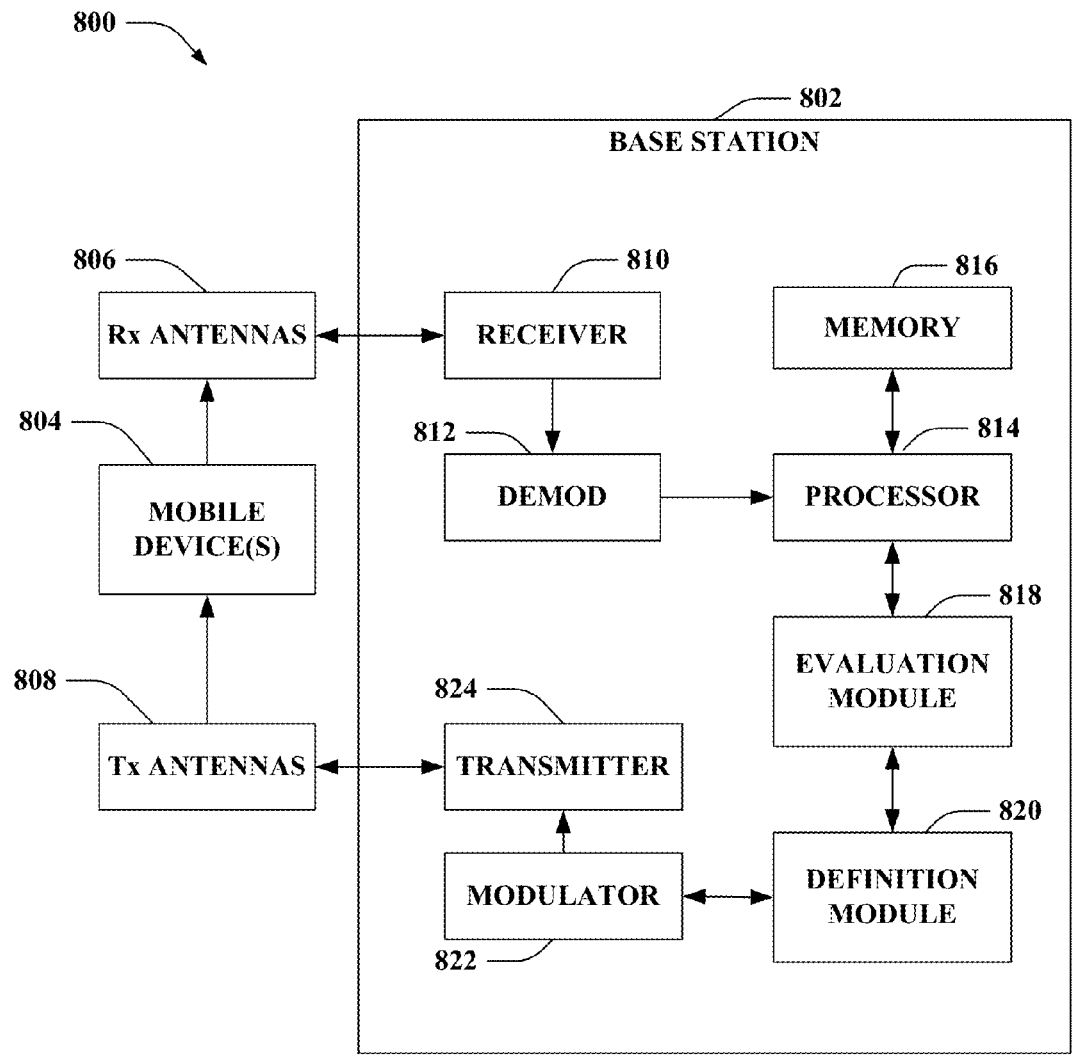
FIG. 8 is an illustration of an example system that facilitates managing random access resource assignment in a wireless communication environment.

FIG. 8 is an illustration of a system 800 that facilitates managing random access resource assignment in a wireless communication environment as described supra. The system 800 comprises a base station 802 (e.g., access point, . . . ) with a receiver 810 that receives signal(s) from one or more mobile devices 804 through a plurality of receive antennas 806, and a transmitter 824 that transmits to the one or more mobile devices 804 through a transmit antenna 808. Receiver 810 can receive information from receive antennas 806 and is operatively associated with a demodulator 812 that demodulates received information. Demodulated symbols are analyzed by a processor 814 that can be similar to the processor described above with regard to FIG. 7, and which is coupled to a memory 816 that stores information related to estimating a signal (e.g., pilot) strength and/or interference strength, data to be transmitted to or received from mobile device(s) 804 (or a disparate base station (not shown)), and/or any other suitable information related to performing the various actions and functions set forth herein.

Processor 814 is further coupled to an evaluation module 818 and/or a definition module 820. The evaluation module 818 can evaluate various characteristics related to load and/or delay for at least one of a user equipment or a base station. The evaluation module 818 can collect load/delay information that can be utilized to define a number of available random access resources. The definition module 820 can set a defined value for a number of available random access resources to which a user equipment can be assigned. It is to be appreciated that the definition module 820 can utilize a default value, a static value, a dynamic value, etc. Moreover, the definition module 820 can leverage the evaluation module 818 in order to dynamically adjust the defined number of available random access resources based upon the evaluated characteristics.

Additionally, the definition module 820 can define the number of available random access resources within a system information block in order to enable a user equipment to access such information. Furthermore, although depicted as being separate from the processor 814, it is to be appreciated that the evaluation module 818, definition module 820, demodulator 812, and/or modulator 822 can be part of the processor 814 or multiple processors (not shown).

Figure 9:
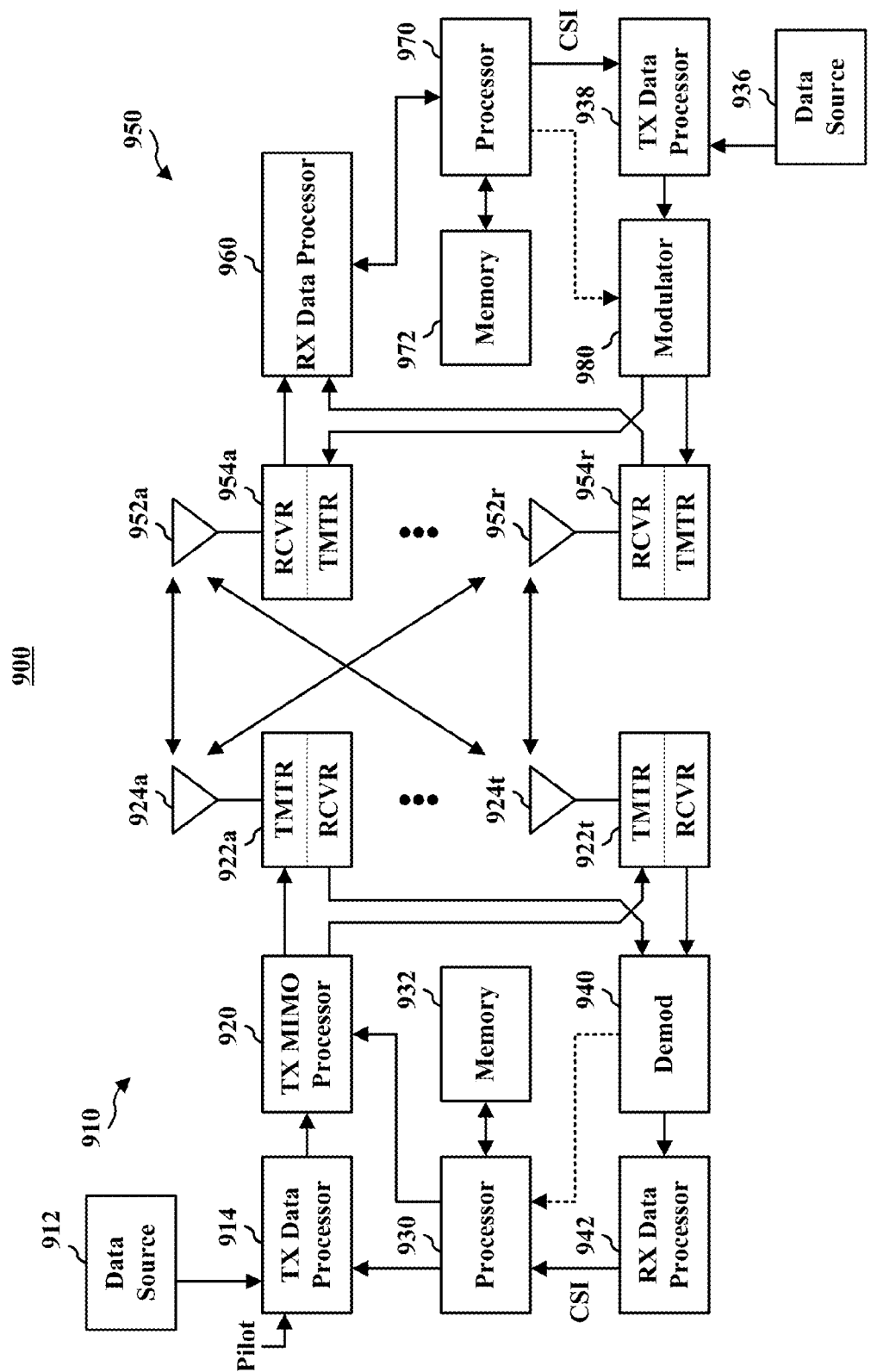
FIG. 9 is an illustration of an example wireless network environment that can be employed in conjunction with the various systems and methods described herein.

FIG. 9 shows an example wireless communication system 900. The wireless communication system 900 depicts one base station 910 and one mobile device 950 for sake of brevity. However, it is to be appreciated that system 900 can include more than one base station and/or more than one mobile device, wherein additional base stations and/or mobile devices can be substantially similar or different from example base station 910 and mobile device 950 described below. In addition, it is to be appreciated that base station 910 and/or mobile device 950 can employ the systems (FIGS. 1-3 and 7-8), techniques/configurations (FIG. 4) and/or methods (FIGS. 5-6) described herein to facilitate wireless communication there between.

At base station 910, traffic data for a number of data streams is provided from a data source 912 to a transmit (TX) data processor 914. According to an example, each data stream can be transmitted over a respective antenna. TX data processor 914 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 950 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 930.

The modulation symbols for the data streams can be provided to a TX MIMO processor 920, which can further process the modulation symbols (e.g., for OFDM). TX MIMO processor 920 then provides $N_T$ modulation symbol streams to $N_T$ transmitters (TMTR) 922a through 922t. In various embodiments, TX MIMO processor 920 applies beamforming weights to the symbols of the data streams and to the antenna from which the symbol is being transmitted.

Each transmitter 922 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 922a through 922t are transmitted from $N_T$ antennas 924a through 924t, respectively.

At mobile device 950, the transmitted modulated signals are received by $N_R$ antennas 952a through 952r and the received signal from each antenna 952 is provided to a respective receiver (RCVR) 954a through 954r. Each receiver 954 conditions (e.g., filters, amplifies, and downconverts) a respective signal, digitizes the conditioned signal to provide samples, and further processes the samples to provide a corresponding "received" symbol stream.

An RX data processor 960 can receive and process the $N_R$ received symbol streams from $N_R$ receivers 954 based on a particular receiver processing technique to provide $N_T$ "detected" symbol streams. RX data processor 960 can demodulate, deinterleave, and decode each detected symbol stream to recover the traffic data for the data stream. The processing by RX data processor 960 is complementary to that performed by TX MIMO processor 920 and TX data processor 914 at base station 910.

A processor 970 can periodically determine which precoding matrix to utilize as discussed above. Further, processor 970 can formulate a reverse link message comprising a matrix index portion and a rank value portion.

The reverse link message can comprise various types of information regarding the communication link and/or the received data stream. The reverse link message can be processed by a TX data processor 938, which also receives traffic data for a number of data streams from a data source 936, modulated by a modulator 980, conditioned by transmitters 954a through 954r, and transmitted back to base station 910.

At base station 910, the modulated signals from mobile device 950 are received by antennas 924, conditioned by receivers 922, demodulated by a demodulator 940, and processed by a RX data processor 942 to extract the reverse link message transmitted by mobile device 950. Further, processor 930 can process the extracted message to determine which precoding matrix to use for determining the beamforming weights.

Processors 930 and 970 can direct (e.g., control, coordinate, manage, etc.) operation at base station 910 and mobile device 950, respectively. Respective processors 930 and 970 can be associated with memory 932 and 972 that store program codes and data. Processors 930 and 970 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 10:
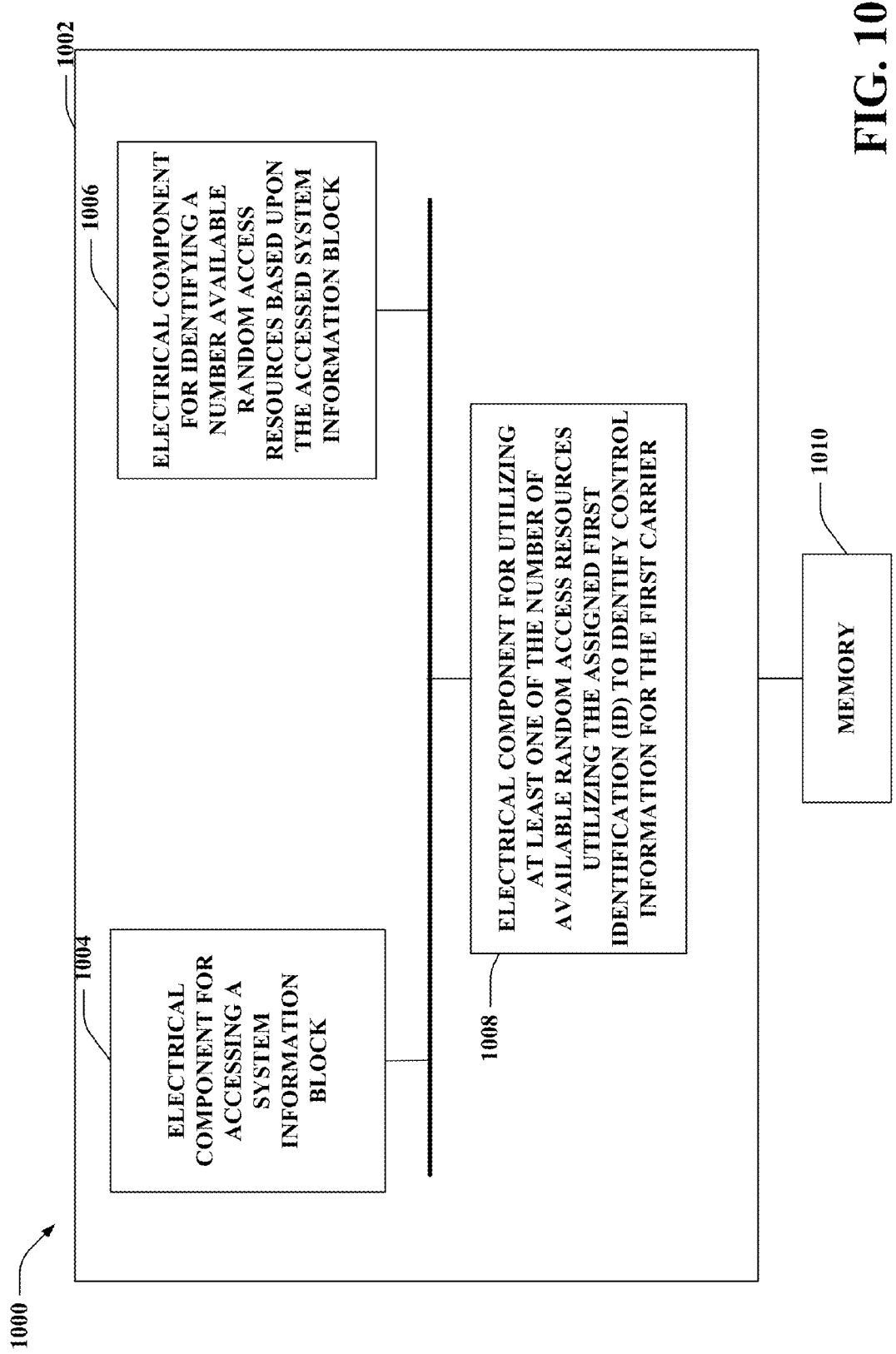
FIG. 10 is an illustration of an example system that facilitates assigning a random access resource to a user equipment.

With reference to FIG. 10, illustrated is a system 1000 that provides optimized assignment to a random access resource based upon a defined number of available random access resources. For example, system 1000 can reside at least partially within a base station, mobile device, etc. It is to be appreciated that system 1000 is represented as including functional blocks, which can be functional blocks that represent functions implemented by a processor, software, or combination thereof (e.g., firmware). System 1000 includes a logical grouping 1002 of electrical components that can act in conjunction. The logical grouping 1002 can include an electrical component for accessing a system information block 1004. In addition, the logical grouping 1002 can comprise an electrical component for identifying a number available random access resources based upon the accessed system information block 1006. Moreover, the logical grouping 1002 can include an electrical component for utilizing at least one of the number of available random access resources 1008. Additionally, system 1000 can include a memory 1010 that retains instructions for executing functions associated with electrical components 1004, 1006, and 1008. While shown as being external to memory 1010, it is to be understood that one or more of electrical components 1004, 1006, and 1008 can exist within memory 1010.

Figure 11:
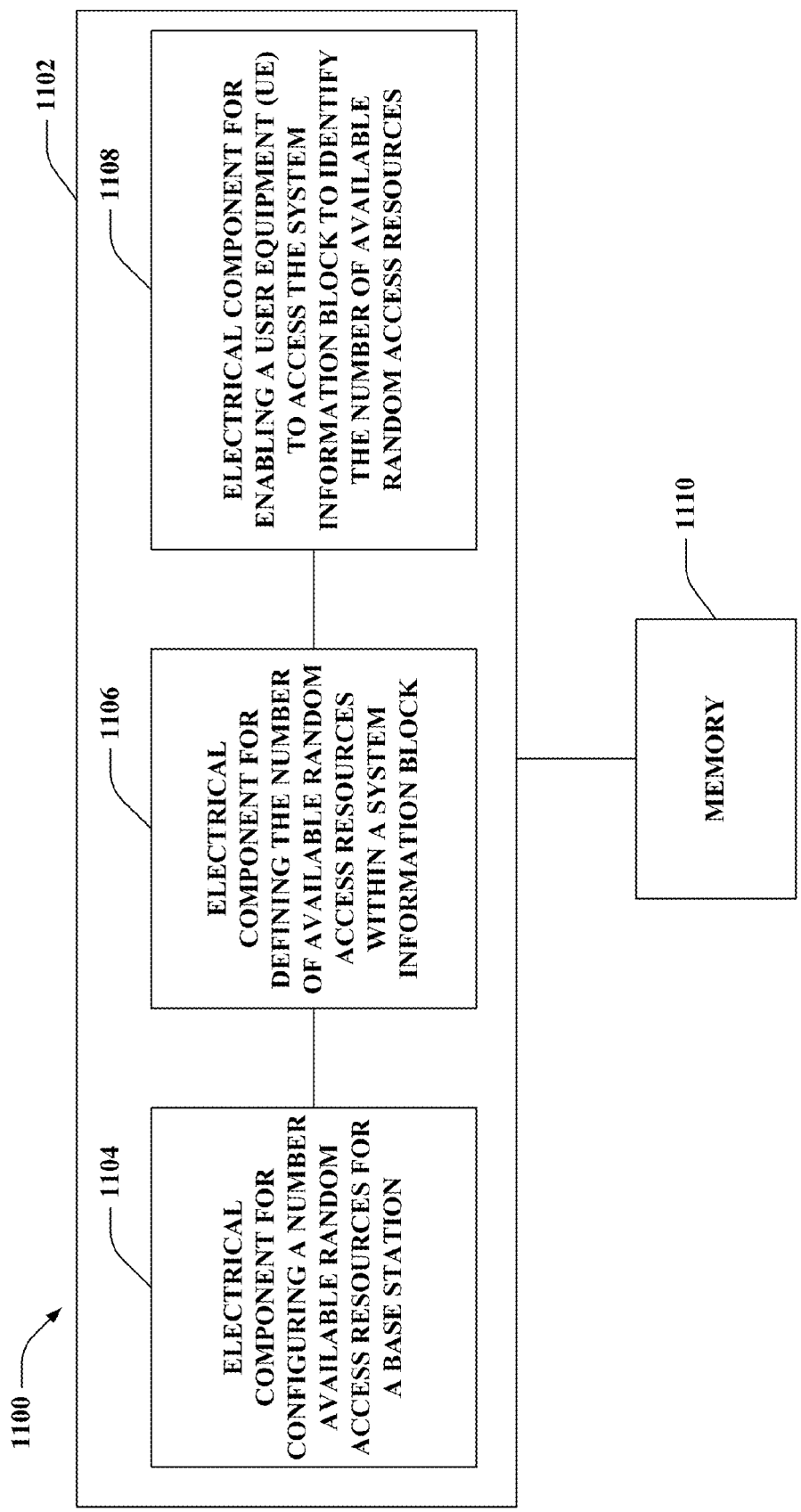
FIG. 11 is an illustration of an example system that manages random access resource assignment within a wireless communications environment in a wireless communication environment.

Turning to FIG. 11, illustrated is a system 1100 that adjusts a number of available random access resources that a user equipment can be assigned in a wireless communications network in order to minimize load and delay. System 1100 can reside within a base station, mobile device, etc., for instance. As depicted, system 1100 includes functional blocks that can represent functions implemented by a processor, software, or combination thereof (e.g., firmware). The logical grouping 1102 can include an electrical component for configuring a number available random access resources for a base station 1104. In addition, the logical grouping 1102 can comprise an electrical component for defining the number of available random access resources within a system information block 1106. Moreover, the logical grouping 1102 can include an electrical component for enabling a user equipment (UE) to access the system information block to identify the number of available random access resources 1108. Additionally, system 1100 can include a memory 1110 that retains instructions for executing functions associated with electrical components 1104, 1106, and 1108. While shown as being external to memory 1110, it is to be understood that one or more of electrical components 1104, 1106, and 1108 can exist within memory 1110.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method used in a wireless communications system, comprising:

accessing a system information block comprising information regarding available random access resources for a base station available to any mobile device in a plurality of mobile devices;

utilizing at least one of available random access resources; and implementing a time shift between a first Physical Random Access Channel (PRACH) configuration and a second Physical Random Access Channel (PRACH) configuration, wherein the first Physical Random Access Channel (PRACH) configuration relates to a mobile device in the plurality of mobile devices and the second PRACH configuration relates to a disparate mobile device in the plurality of mobile devices.

2. The method of claim 1, further comprising receiving at least one of the available random access resources uniformly selected by the base station.

3. The method of claim 1, further comprising receiving at least one of the available random access resources uniformly assigned by the base station.

4. The method of claim 1, further comprising receiving at least one of the available random access resources randomly selected by the base station.

5. The method of claim 1, further comprising receiving at least one of the available random access resources randomly assigned by the base station.

6. The method of claim 1, wherein the available random access resources to which a mobile device can be assigned is determined by a default value.

7. The method of claim 6, wherein the default value is a positive integer greater than zero (0).

8. The method of claim 1, further comprising receiving an amount of delay related to one of the mobile devices in the plurality of mobile devices and at least one of the available random access resources.

9. The method of claim 1, further comprising utilizing at least one of the available random access resources based upon a random assignment by at least one of a network or the base station.

10. The method of claim 1, further comprising utilizing at least one of the available random access resources based upon a random selection by at least one of a network or the base station.

11. The method of claim 1, further comprising utilizing at least one of the available random access resources based upon a uniform assignment by at least one of a network or the base station.

12. The method of claim 1, further comprising utilizing at least one of the available random access resources based upon a uniform selection by at least one of a network or the base station.

13. The method of claim 1, wherein the second Physical Random Access Channel (PRACH) configuration includes an added time shift in comparison to the first Physical Random Access Channel (PRACH) configuration.

14. A mobile device, comprising:
at least one processor configured to:
access a system information block comprising information regarding available random access resources for a base station available to any mobile device in a plurality of mobile devices;
utilize at least one of the number of available random access resources; and
implement a time shift between a first Physical Random Access Channel (PRACH) configuration and a second Physical Random Access Channel (PRACH) configuration, wherein the first Physical Access Channel (PRACH) configuration relates to the mobile device and the second PRACH configuration relates to a disparate mobile device; and wherein the second Physical Random Access Channel (PRACH) configuration includes an added time shift in comparison to the first Physical Random Access Channel (PRACH) configuration; and
a memory coupled to the at least one processor.

15. The mobile device of claim 14, wherein the at least one processor is further configured to receive at least one of the available random access resources uniformly assigned by the base station.

16. The mobile device of claim 14, wherein the at least one processor is further configured to receive at least one of the available random access resources uniformly selected by the base station.

17. The mobile device of claim 14, wherein the at least one processor is further configured to receive at least one of the available random access resources randomly assigned by the base station.

18. The mobile device of claim 14, wherein the at least one processor is further configured to receive at least one of the available random access resources randomly selected by the base station.

19. The mobile device of claim 14, wherein the available random access resources that can be assigned is a default value.

20. The mobile device of claim 19, wherein the default value is a positive integer greater than zero (0).

21. The mobile device of claim 14, wherein the at least one processor is further configured to receive an amount of delay related to the mobile device and at least one of the available random access resources.

22. The mobile device of claim 14, wherein the at least one processor is further configured to utilize at least one of the available random access resources based upon a random assignment by at least one of a network or the base station.

23. The mobile device of claim 14, wherein the at least one processor is further configured to utilize at least one of the available random access resources from the available random access resources selected randomly by the base station.

24. The mobile device of claim 14, further wherein the at least one processor is further configured to utilize at least one of the available random access resources based upon a uniform assignment by at least one of a network or the base station.

25. The mobile device of claim 14, wherein the at least one processor is further configured to utilize at least one of the available random access resources from the available random access resources uniformly selected by the base station.

26. A mobile device, comprising:
means for accessing a system information block comprising information regarding available random access resources for a base station available to any mobile device in a plurality of mobile devices;
means for utilizing at least one of the available random access resources; and
means for implementing a time shift between a first Physical Random Access Channel (PRACH) configuration and a second Physical Random Access Channel (PRACH) configuration, wherein the first Physical Random Access Channel (PRACH) configuration relates to the mobile device and the second PRACH configuration relates to a disparate mobile device.

27. The mobile device of claim 26, further comprising means for receiving at least one of the available random access resources uniformly assigned by the base station.

28. The mobile device of claim 26, further comprising means for receiving at least one of the available random access resources uniformly selected by the base station.

29. The mobile device of claim 26, further comprising means for receiving at least one of the available random access resources randomly assigned by the base station.

30. The mobile device of claim 26, further comprising means for receiving at least one of the number of available random access resources randomly selected by the base station.

31. The mobile device of claim 26, wherein the number of available random access resources that can be assigned is determined by a default value.

32. The mobile device of claim 31, wherein the default value is a positive integer greater than zero (0).

33. The mobile device of claim 26, further comprising means for receiving an amount of delay related to related to the mobile device and at least one of the available random access resources.

34. The mobile device of claim 26, further comprising means for utilizing at least one of the available random access resources based upon a random assignment by at least one of a network or the base station.

35. The mobile device of claim 26, further comprising means for utilizing at least one of the available random access resources randomly selected by the base station.

36. The mobile device of claim 26, further comprising means for utilizing at least one of the available random access resources based upon a uniform assignment by at least one of a network or a base station.

37. The mobile device of claim 26, further comprising means for utilizing at least one of the available random access resources uniformly selected by the base station.

38. A non-transitory computer program product, comprising:
a computer-readable storage medium comprising:
code for causing at least one computer to access a system information comprising information regarding available random access resources for a base station available to any mobile device in a plurality of mobile devices; and
code for causing at least one computer to utilize at least one of the available random access resources; and
code for causing at least one computer to implement a time shift between a first Physical Random Access Channel (PRACH) configuration and a second Physical Random Access Channel (PRACH) configuration, wherein the first Physical Random Access Channel (PRACH) configuration relates to a mobile device in the plurality of mobile devices and the second PRACH configuration relates to a disparate mobile device in the plurality of mobile devices.

39. The computer program product of claim 38, wherein the computer-readable storage medium further comprising:
code for causing at least one computer to receive at least one of the available random access resources which is uniformly assigned by the base station to two or more of the plurality of mobile devices.

40. The computer program product of claim 38, wherein the computer-readable storage medium further comprising:
code for causing at least one computer to receive at least one of the available random access resources uniformly selected by the base station.

41. The computer program product of claim 38, wherein the computer-readable storage medium further comprising:
code for causing at least one computer to receive at least one of the available random access resources randomly assigned by the base station.

42. The computer program product of claim 38, wherein the computer-readable storage medium further comprising:
code for causing at least one computer to receive at least one of the available random access resources randomly assigned by the base station.

43. The computer program product of claim 38, wherein the computer-readable storage medium further comprising:
code for causing at least one computer to receive an amount of delay related to a mobile device in the plurality of mobile devices and at least one of the available random access resources.

44. A method used in a wireless communications system, comprising:
configuring, for a base station, a number available random access resources useable by a plurality of mobile devices;
defining the number of available random access resources within a system information block, the number of available random access resources available to any mobile device in the plurality of mobile devices; and
enabling at least one mobile device in the plurality of mobile devices to access the system information block and utilize at least one of the number of available random access resources; and
implementing a time shift between a first Physical Random Access Channel (PRACH) configuration and a second Physical Random Access Channel (PRACH) configuration, wherein the first Physical Random Access Channel (PRACH) configuration relates to a mobile device in the plurality of mobile devices and the second PRACH configuration relates to a disparate mobile device in the plurality of mobile devices.

45. The method of claim 44, further comprising configuring the number of available random access resources that can be assigned to the at least one mobile device as a default value.

46. The method of claim 45, wherein the default value is a positive integer greater than zero (0).

47. The method of claim 44, further comprising configuring the number of available random access resources based upon a load associated with the base station, wherein the load relates to an amount of mobile devices in the plurality of mobile devices in communication with the base station.

48. The method of claim 44, further comprising adjusting the number of available random access resources based upon a delay associated with the base station and the plurality of mobile devices.

49. The method of claim 48, further comprising increasing the number of available random access resources which increases the delay.

50. The method of claim 48, further comprising decreasing the number of available random access resources which decreases the delay.

51. The method of claim 48, further comprising managing the number of available random access resources with at least one of an increase or a decrease in order to maintain a defined amount of delay.

52. The method of claim 44, further comprising configuring the number of available random access resources based upon a portion of historic data related to a load for the base station.

53. The method of claim 52, wherein the portion of historic data relates to a number mobile devices in the plurality of mobile devices utilizing the base station at a set time period.

54. The method of claim 44, wherein the second Physical Random Access Channel (PRACH) configuration includes an added time shift in comparison to the first Physical Random Access Channel (PRACH) configuration.

55. A base station, comprising:
at least one processor configured to:
configure a number available random access resources useable by a plurality of mobile devices;
define the number of available random access resources within a system information block, the number of available random access resources available to any mobile device in the plurality of mobile devices;
enable at least one mobile device in the plurality of mobile devices to access the system information block and utilize at least one of the number of available random access resources; and
implement a time shift between a first Physical Random Access Channel (PRACH) configuration and a second Physical Random Access Channel (PRACH) configuration, wherein the first Physical Random Access Channel (PRACH) configuration relates to a mobile device in the plurality of mobile devices and the second PRACH configuration relates to a disparate mobile device in the plurality of mobile devices; and
a memory coupled to the at least one processor.

56. The base station of claim 55, wherein the at least one processor is further configured to:
configure the number of available random access resources based upon a load associated with the base station, wherein the load relates to an amount of mobile devices in the plurality of mobile devices in communication with the base station.

57. The base station of claim 55, wherein the at least one processor is further configured to:
adjust the number of available random access resources based upon a delay associated with the base station and the plurality of mobile devices.

58. A base station, comprising:
means for configuring a number available random access resources useable by a plurality of mobile devices;
means for defining the number of available random access resources within a system information block, the number of available random access resources available to any mobile device in the plurality of mobile devices;
means for enabling at least one mobile device in the plurality of mobile devices to access the system information block and utilize at least one of the number of available random access resources; and
means for implementing a time shift between a first Physical Random Access Channel (PRACH) configuration and a second Physical Random Access Channel (PRACH) configuration, wherein the first Physical Random Access Channel (PRACH) configuration relates to a mobile device in the plurality of mobile devices and the second PRACH configuration relates to a disparate mobile device in the plurality of mobile devices.

59. The base station of claim 58, further comprising means for configuring the number of available random access resources that can be assigned to the at least one mobile device as a default value.

60. The base station of claim 58, further comprising means for configuring the number of available random access resources based upon a load associated with the base station, wherein the load relates to an amount of mobile devices in the plurality of mobile devices in communication with base station.

61. The base station of claim 58, further comprising means for adjusting the number of available random access resources based upon a delay associated with the base station and the plurality of mobile devices.

62. The base station of claim 61, further comprising means for increasing the number of available random access resources which increases the delay.

63. The base station of claim 61, further comprising means for decreasing the number of available random access resources which decreases the delay.

64. The base station of claim 61, further comprising means for managing the number of available random access resources with at least one of an increase or a decrease in order to maintain a defined amount of delay.

65. The base station of claim 58, further comprising means for configuring the number of available random access resources based upon a portion of historic data related to a load for the base station.

66. A non-transitory computer program product, comprising:
a computer-readable storage medium comprising:
code for causing at least one computer to configure, for a base station, a number available random access resources useable by a plurality of mobile devices;
code for causing at least one computer to define the number of available random access resources within a system information block, the number of available random access resources available to any mobile device in the plurality of mobile devices; and
code for causing at least one computer to enable at least one mobile device in the plurality of mobile devices to access the system information block and utilize at least one of the number of available random access resources; and
code for implementing a time shift between a first Physical Random Access Channel (PRACH) configuration and a second Physical Random Access Channel fPRACH) configuration, wherein the first Physical Random Access Channel (PRACH) configuration relates to a mobile device in the plurality of mobile devices and the second PRACH configuration relates to a disparate mobile device in the plurality of mobile devices.

67. The computer program product of claim 66, wherein the computer-readable storage medium further comprising:
code for causing at least one computer to configure the number of available random access resources based upon a load associated with the base station, wherein the load relates to an amount of mobile devices in the plurality of mobile devices in communication with the base station.

68. The computer program product of claim 66, wherein the computer-readable storage medium further comprising:
code for causing at least one computer to adjust the number of available random access resources based upon a delay associated with the base station and the plurality of mobile devices.

* * * * *